United States Patent
Abe et al.

(10) Patent No.: US 8,374,779 B2
(45) Date of Patent: Feb. 12, 2013

(54) NAVIGATION DEVICE AND IMAGE MANAGEMENT METHOD

(75) Inventors: Yuichi Abe, Tottori (JP); Ryo Watanabe, Tottori (JP); Kazuhiro Yamane, Tottori (JP); Tomoyuki Yoshimura, Tottori (JP); Tadashi Sakai, Tottori (JP); Toshiyuki Irie, Tottori (JP); Tomoaki Maeta, Tottori (JP); Kazuya Murakami, Tottori (JP)

(73) Assignees: Sanyo Electric Co., Ltd., Osaka (JP); Sanyo Consumer Electronics Co., Ltd, Tottori (JP)

( * ) Notice: Subject to any disclaimer, the term of this patent is extended or adjusted under 35 U.S.C. 154(b) by 567 days.

(21) Appl. No.: 12/596,722

(22) PCT Filed: Jul. 28, 2008

(86) PCT No.: PCT/JP2008/063504
§ 371 (c)(1),
(2), (4) Date: Oct. 20, 2009

(87) PCT Pub. No.: WO2009/017085
PCT Pub. Date: Feb. 5, 2009

(65) Prior Publication Data
US 2010/0138153 A1   Jun. 3, 2010

(30) Foreign Application Priority Data
Jul. 31, 2007   (JP) .................. 2007-199410
Sep. 26, 2007   (JP) .................. 2007-248510

(51) Int. Cl.
*G01C 21/00*   (2006.01)
*G08G 1/0696*   (2006.01)
*G06F 19/00*   (2006.01)

(52) U.S. Cl. ...... 701/431; 701/437; 345/619; 340/815.4

(58) Field of Classification Search .................. 701/431, 701/428, 438, 420, 527; 348/135; 340/815.4; 715/850
See application file for complete search history.

(56) References Cited

U.S. PATENT DOCUMENTS
(Continued)

FOREIGN PATENT DOCUMENTS
JP   59-060214   4/1984
JP   08-171697   7/1996
(Continued)

OTHER PUBLICATIONS

Chinese Office Action, with English Translation, issued in Chinese Patent Application No. 200880020471.1, dated Sep. 22, 2011.
(Continued)

*Primary Examiner* — Tan Q Nguyen
(74) *Attorney, Agent, or Firm* — McDermott Will & Emery LLP

(57) ABSTRACT

A navigation device which stores a captured image of an area ahead of user in a moving direction after turning at an intersection and displays the captured image before turning at the intersection, includes: a first storage unit (HDD recording/playback unit 14) storing a map; a display unit (display unit 18); and a control unit (control unit 10) displaying the map on the display unit, and the navigation device further includes a second storage unit (HDD recording/playback unit 14) storing a captured image of an area to be entered after a turn is made at an intersection, and the control unit displays the captured image stored in the second storage unit on the display unit before a mobile body reaches the intersection.

15 Claims, 9 Drawing Sheets

U.S. PATENT DOCUMENTS

| | | | |
|---|---|---|---|
| 6,199,014 B1 * | 3/2001 | Walker et al. | 701/428 |
| 7,460,953 B2 * | 12/2008 | Herbst et al. | 701/438 |
| 7,630,830 B2 * | 12/2009 | Watanabe | 701/420 |
| 7,827,507 B2 * | 11/2010 | Geise et al. | 715/850 |
| 2006/0256212 A1 | 11/2006 | Choi | |
| 2006/0287819 A1 * | 12/2006 | Brulle-Drews et al. | 701/211 |
| 2007/0067104 A1 * | 3/2007 | Mays | 701/211 |
| 2007/0192020 A1 * | 8/2007 | Brulle-Drews et al. | 701/200 |
| 2010/0070162 A1 * | 3/2010 | Aihara | 701/201 |
| 2010/0283867 A1 | 11/2010 | Choi | |

FOREIGN PATENT DOCUMENTS

| | | |
|---|---|---|
| JP | 09-014976 | 1/1997 |
| JP | 11-132915 | 5/1999 |
| JP | 2000-065588 | 3/2000 |
| JP | 2002-296061 | 10/2002 |
| JP | 2005-003752 | 1/2005 |
| JP | 2005-275978 | 10/2005 |
| JP | 2006-221362 | 8/2006 |
| JP | 2007-115077 | 5/2007 |
| KR | 10-2006-0118097 | 11/2006 |
| WO | WO 2005/073830 A2 | 8/2005 |

OTHER PUBLICATIONS

Korean Office Action issued in Korean Patent Application No. 10-2011-7014390, dated Jul. 6, 2011.

* cited by examiner

FIG.3

| INTERSECITON POSITION INFORMATION | IMAGE INFORMATION | IMAGE CAPTURING DATE AND TIME | APPROACH PATH INFORMATION |

FIG.8

PREDETERMINED CHARACTER STRING

| MOVING STATE | EXTRACTED CHARACTER STRING | PREDETERMINED CHARACTER STRING |
|---|---|---|
| STOPPING | CHARACTER STRING SPECIFYING IMAGE CAPTURING POINT<br><br>EX.: REST AREA "A" | AT |
| MOVING | CHARACTER STRING OF PLACE/FACILITY NAME NEAR IMAGE CAPTURING POINT<br><br>EX.: LAKE HAMANA | NEAR |
| | CHARACTER STRING SPECIFYING IMAGE CAPTURING POINT<br><br>EX: BIWAKO-OHASHI BRIDGE, FREE WAY "B" | MOVING ALONG |
| | CHARACTER STRING OF PLACE/FACILITY NAME NEAR IMAGE CAPTURING POINT<br><br>EX: UENO-KOEN PARK, AMUSEMENT PARK "B" | MOVING NEAR |

NAVIGATION DEVICE AND IMAGE MANAGEMENT METHOD

RELATED APPLICATIONS

This application is the U.S. National Phase under 35 U.S.C. §371 of International Application No. PCT/JP2008/063504, filed on Jul. 28, 2008, which in turn claims the benefit of Japanese Application No. 2007-199410, filed on Jul. 31, 2007 and Japanese Application No. 2007-248510, filed Sep. 26, 2007, the disclosures of which Applications are incorporated by reference herein.

TECHNICAL FIELD

The present invention relates to a navigation device that displays an image. In particular, the present invention relates to a navigation device that stores a captured image of an area to be entered after turning at an intersection and displays the captured image before turning at the intersection.

BACKGROUND ART

Conventionally, navigation devices that are designed as standard equipment for mobile bodies and portable navigation devices that are designed both for use in any mobile bodies and for use by pedestrians have been commercially available. In addition, mobile-phone terminals having navigation functions have also been commercially available.

Such navigation devices provide guidance at an intersection as to in which direction to go by various methods. In a commonly used method, a route from a current position to a destination is previously set and, for example, an enlarged image of an intersection is displayed and a sound notification such as "Turn right at the intersection about 50 meters ahead" is given on reaching a predetermined distance from an intersection to make a turn at.

Patent Document 1 discloses another method in which an image of an intersection ahead is captured according to key operation, the captured image of the intersection ahead is stored together with coordinates of the intersection, and the captured image is displayed at a next occasion of approaching the intersection. Patent Document 2 discloses still another method in which an image of an intersection ahead is captured not according to key operation but according to operation of a direction indicator, and the captured image is displayed at a next occasion of approaching the intersection.

Patent Document 1: JP-A-H09-014976
Patent Document 2: JP-A-2006-221362

DISCLOSURE OF THE INVENTION

Problems to be Solved by the Invention

With the above-mentioned conventional methods, however, when a clear, unobstructed view cannot be obtained in the vicinity of an intersection, it is impossible to check, before turning at the intersection, what an area to be entered after turning at the intersection is like. For example, when a destination cannot be set because a user does not know an address or a telephone number of a shop the user wishes to go to, or when the user forgets whether the shop is on right side or on the left side of a next intersection, the user needs to actually make a right or left turn at the intersection to find it out. The user also needs to actually make a right or left turn at an intersection when the user has once passed through the intersection and thus is sure that the user will recognize the shop if the user actually makes a turn and see the view there, but the user does not remember whether the user should make a right turn or a left turn. Hence, there has been a demand for knowing, before turning at an intersection, what an area to be entered after turning at the intersection is like.

The present invention has been made in view of the above described problems, and an object of the present invention is to provide a navigation device capable of displaying a scene of an area to be entered after turning before actually doing so.

Means to Solve the Problem

To solve the above described problems, according to a first aspect of the present invention, a navigation device includes: a first storage unit storing a map; a display unit; and a control unit displaying the map on the display unit, and the navigation device is characterized in that the navigation device further comprises a second storage unit storing a captured image of an area to be entered after a turn is made at an intersection, and the control unit displays the captured image stored in the second storage unit on the display unit before a mobile body reaches the intersection.

According to a second aspect of the present invention, the navigation device according to the above described first aspect further includes a first image capturing unit capturing an image of area ahead of the mobile body in the traveling direction of the mobile body, the navigation device is characterized in that when the mobile body has made a turn at the intersection, the control unit captures, by the first image capturing unit, an image of area ahead of the mobile body in the moving direction of the mobile body after the turn to obtain a captured image of the area, and the control unit stores the captured image captured by the first image capturing unit in the second storage unit.

According to a third aspect of the present invention, the navigation device according to the above described second aspect further includes a direction sensor detecting a moving direction of the mobile body, the navigation device is characterized in that the control unit detects, according to detection result of the direction sensor, timing for capturing the image.

According to a fourth aspect of the present invention, the navigation device according to any one of the above described one to third aspects further includes a second image capturing unit capturing an image of area behind the mobile body in the moving direction of the mobile body, the navigation device is characterized in that the control unit captures, by the second image capturing unit, an image of area behind the mobile body in the moving direction of the mobile body before the mobile body reaches the intersection to obtain a captured image of the area, and the control unit stores the captured image captured by the second image capturing unit in the second storage unit.

According to a fifth aspect of the present invention, the navigation device according to the above described fourth aspect further includes a detecting unit detecting ON/OFF states of a direction indicator provided in the mobile body, the navigation device is characterized in that the control unit detects, according to detection result of the detecting unit, timing for capturing the image of an area behind the mobile body in the moving direction of the mobile body before the mobile body reaches the intersection.

According to a sixth aspect of the present invention, in the navigation device according to the above described fourth or fifth aspect, the navigation device is characterized in that when the mobile body has not made a turn at the intersection but gone straight therethrough, the control unit deletes the captured image of the area behind the mobile body in the moving direction of the mobile body captured by the second image capturing unit and stored in the second storage unit.

According to a seventh aspect of the present invention, in the navigation device according to any one of the above-described fourth to sixth aspects, the navigation device is characterized in that the control unit switches between ON and OFF modes to activate or deactivate image capturing operation performed by the second capturing unit, and in the ON mode is captured an image of area behind the mobile body in a moving direction of the mobile body.

According to an eighth aspect of the present invention, in the navigation device according to any one of the above-described first to seventh aspects, the navigation device is characterized in that when the mobile body has made a turn at the intersection, the control unit continues to play on the display unit the captured image stored in the second storage unit until the mobile body reaches a predetermined point after making the turn at the intersection.

According to a ninth aspect of the present invention, the navigation device according to any one of the above-described first to eighth aspects further includes a play key, the navigation device is characterized in that the control unit displays, on the display unit, the captured image stored in the second storage unit in response to the play key being operated.

According to a tenth aspect of the present invention, in the navigation device according to the above-described second or third aspect, the navigation device is characterized in that when the mobile body has made a turn at the intersection, the control unit stores, in the second storage unit, a direction of the turn made at the intersection in association with the captured image, and the control unit displays, on the display unit, the direction of the turn made at the intersection together with the captured image.

According to an eleventh aspect of the present invention, in the navigation device according to any one of the above-described fourth to seventh aspects, the navigation device is characterized in that when the mobile body has made a turn at the intersection, the control unit stores, in the second storage unit, in association with the captured image, a direction that is directly opposite to a moving direction in which the mobile body travels after making the turn at the intersection, and the control unit displays, on the display unit, together with the captured image, the direction that is directly opposite to the moving direction in which the mobile body travels after making the turn at the intersection.

According to a twelfth aspect of the present invention, a navigation device for a mobile body includes: a current position detecting unit detecting a current position; an image capturing unit; an image file storage unit storing data of an image captured by the image capturing unit; a map storage unit storing map information; and a display unit displaying a map image, the navigation device is characterized in that the navigation device further comprising: a moving state detecting unit detecting whether the mobile body is in a moving state or in a stopping state; a character string extraction unit extracting, from the map information, at least one of character strings representing a name of a place, a facility, a road, and an intersection at or near a current position; and a file name determination unit determining a file name of data of an image captured by the image capturing unit, the navigation device is characterized in that when the image capturing unit captures an image, a file name of data of the captured image is determined by combining a moving state detected by the moving state detecting unit, a character string extracted by the character string extraction unit, and a predetermined character string that is provided beforehand in the file name determination unit.

According to a thirteenth aspect of the present invention, in the navigation device according to the above described twelfth aspect, the navigation device is characterized in that the predetermined character string contains either a character string indicating that the mobile body is stopping or a character string indicating that the mobile body is moving.

According to a fourteenth aspect of the present invention, in the navigation device according to the above described thirteenth aspect, the navigation device is characterized in that the predetermined character string contains a predetermined character string indicating that the character string extracted by the character string extraction unit from the map information is a character string related to a predetermined area near a current position.

According to a fifteenth aspect of the present invention, an image management method includes steps of: generating a captured image of an area near a mobile body by an image capturing unit; detecting a moving state of the mobile body whether the mobile body is in a moving state or in a stopping state; obtaining current position information by extracting, from map information, at least one of character strings representing a name of a place, a facility, a road, and an intersection at or near the current position; and determining a name of the captured image by combining a predetermined character string that is prepared beforehand, the moving state, and the current position information.

Advantages of the Invention

According to the navigation device of the first aspect of the present invention, before turning at an intersection, a user can see a captured image of an area ahead of the user in the moving direction after turning at the intersection, and thus the user can avoid making a wrong turn at the intersection. In addition, the user can see a captured image while waiting at a traffic light.

According to the navigation device of the second aspect of the present invention, a database of captured images of areas ahead of a mobile body in its moving direction after making turns at intersections can be built by the navigation device alone.

According to the navigation device of the third aspect of the present invention, it is possible to detect a turn made at an intersection with a higher accuracy than a GPS in which signals are received intermittently.

According to the navigation device of the fourth aspect of the present invention, a captured image of an area behind a mobile body in its moving direction before it reaches an intersection can be captured on an outward trip, and the captured image can be displayed on a return trip.

In capturing an image of area not ahead of but behind a mobile body in its moving direction, since it cannot be specified beforehand which intersection to turn at, image capturing needs to be performed every time the mobile body approaches any intersection. However, with the navigation device of the fifth aspect of the present invention, it is possible to prevent unnecessary image capturing.

According to the navigation device of the sixth aspect of the present invention, it is possible to prevent unnecessary storage of captured images related to an intersection through which a mobile body has gone straight.

In capturing an image of area not ahead of but behind a mobile body in its moving direction, since it cannot be specified beforehand which intersection to turn at, image capturing needs to be performed every time the mobile body approaches any intersection. However, with the navigation device of the seventh aspect of the present invention, a user can specify an intersection where the user wishes to have an image of area behind him captured, and thus it is possible to prevent unnecessary storage of captured images.

According to the navigation device of the eighth aspect of the present invention, it is possible to compare a current view of an area with the captured image of the area stored in the navigation device.

According to the navigation device of the ninth aspect of the present invention, the user can find that the captured image stored in the second storage unit shows a view the user saw when the user made a turn at the intersection before. In particular, when the user wishes to make a turn in the same direction as before, and just a single captured image is displayed, the user can do so just by turning in the direction in which the user actually sees the same view as shown in the actually capture image.

According to the navigation device of the tenth aspect of the present invention, since the user, before turning at an intersection, can see not only the captured image of an area ahead of the user in the moving direction after the user turns at the intersection but also the direction to make turn as shown with the captured image, the user can make sure in which direction the user should turn at the intersection.

According to the navigation device of the eleventh aspect of the present invention, since the user, before turning at an intersection, can see both captured images after turning right and left at the intersection, the user can make sure in which direction the user should turn at the intersection.

According to the navigation device of the twelfth aspect of the present invention, a file name of data of a captured image is determined by combining together a predetermined character string and a character string representing a name of a place, an intersection, or a road at an image capturing point, or a name of a place or a facility near the image capturing point. The predetermined character strings are set beforehand according to whether the mobile body is in a moving state or in a stopping state, and according to names of locations, intersections, and roads, or according to names of places, facilities, and the like near an image capturing point. Thus, by determining a file name by combining a character string representing the place name of the image capturing point or a related name with a predetermined character string selected according to the state of the mobile body, it becomes easy to arrange a large amount of image data or to find out desired image data later.

According to the navigation device of the thirteenth aspect of the present invention, a file name implies an image capturing place and the state of the mobile body, and this makes it easy to arrange a large amount of image data or to find out desired image data later.

According to the image management method of the fifteenth aspect of the present invention, an image data management method for the navigation device of the above-described twelfth aspect can be provided. Here, since the file name is determined by combining a character string representing the name of the image capturing place or a name related to the image capturing place and a predetermined character string selected according to the state of the mobile body, it is easy to arrange a large amount of image data or to find out desired image data later.

BRIEF DESCRIPTION OF DRAWINGS

FIG. 3 is a diagram to show a memory map of a stored image.

FIG. 8 is a diagram to show examples of combination, according to moving state of a mobile body, of a character string extracted with respect to an image capturing point and a predetermined character string.

Figure 1:
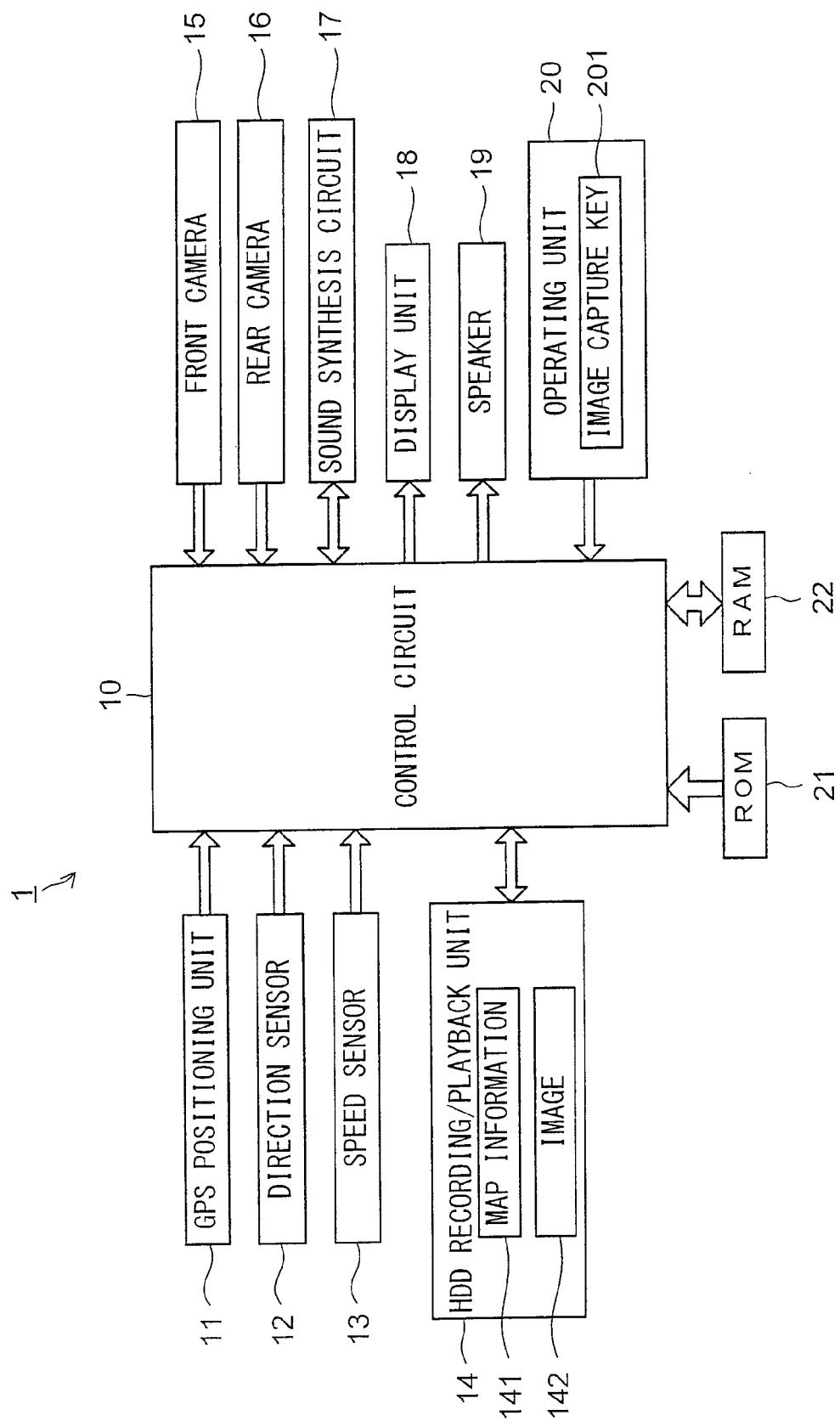
FIG. 1 is a block diagram to show a relevant part of a navigation device according to Embodiment 1 of the present invention.

LIST OF REFERENCE SYMBOLS 1, 100 navigation device
10, 110 control circuit
11 GPS positioning unit
12 direction sensor
13 speed sensor
14 HDD recording/playback unit
15 front camera
16 rear camera
17 sound synthesis circuit
18, 117 display unit
19 speaker
20 operating unit
201 image capture key
202 play key
111 current position detecting unit
112 map storage unit
113 route search unit
114 image capturing unit
115 character string extraction unit
116 input unit
118 image file storage unit
119 moving state detecting unit
120 file name determination unit

BEST MODE FOR CARRYING OUT THE INVENTION

Hereinafter, with reference to the drawings, descriptions will be given of embodiments of the present invention taking up navigation devices as examples. However, it should be noted that the following embodiments simply deal with navigation devices as examples for embodying the technical idea of the present invention, and it is not intended to limit scope of the present invention to the navigation devices dealt with in the embodiments. On the contrary, other embodiments included in claims may equally be applied without departing from the technical idea shown in the scope of the claims.

Embodiment 1

FIG. 1 is a block diagram to show a relevant part of a navigation device according to Embodiment 1 of the present invention.

A GPS (global positioning system) positioning unit 11 receives radio waves carrying location information from a plurality of GPS satellites, calculates its current position, and feeds data of the current position obtained as a result of the calculation to a control circuit 10 which will be described later. A direction sensor 12 detects a direction based on terrestrial magnetism and feeds the detection result to the control circuit 10. A speed sensor 13 detects moving speed based on rotation of tire and acceleration, and feeds the detection result to the control circuit 10. An HDD recording/playback unit 14 has an HDD (hard disk drive), and performs recording/playback of map information 141 and an image (captured image) 142. The map information 141 includes data of gas stations and landmarks, as well as map data such as of roads and intersections.

A front camera 15 captures an image of area ahead of the mobile body, and feeds the captured image of the area to the control circuit 10. A rear camera 16 captures an image of area behind the mobile body, and feeds the captured image of the area to the control circuit 10. Here, the front and rear cameras 15 and 16 both capture actual still images of views, but they may also be provided with a moving image capturing function. A sound synthesis circuit 17 generates a sound of a character specified by the control circuit 10, and outputs the resulting sound to the control circuit 10. A display unit 18 displays a map or an image on which a current position is superposed.

A speaker 19, under control of the control circuit 10, outputs the sound generated by the sound synthesis circuit 17. An operating unit 20 is provided with not only an image capture key 201 for turning ON/OFF an image capture mode but also various keys (not shown) via which to operate the navigation. The control circuit 10 controls the units according to a program stored in a ROM 21. A RAM 22 stores information necessary for the control circuit 10 to perform its operation.

Next, a description will be given of current position detection performed by the control circuit 10. When the navigation device is activated in response to turning-on of an ignition switch (not shown) of a mobile body, the control circuit 10 retrieves a map stored in the HDD recording/playback unit 14 and displays it on the display unit 18. The control circuit 10 then receives data of a current position from the GPS positioning unit 11. It takes several seconds for the control circuit 10 to start the first display of the current position after it receives the data of the current position, but thereafter, display of the current position is updated every second.

The control circuit 10 superposes the received current position on the map displayed on the display unit 18. The control circuit 10 displays the current position received from the GPS positioning unit 11 on the map retrieved from the HDD recording/playback unit 14 such that the current position is laid on a road in the map at a point closest to the current position. This is called map matching.

Current positions are received intermittently every second, and the direction sensor 12 and the speed sensor 13 interpolate current positions while no current position is being received from the GPS positioning unit 11. In particular, a change in position made by the mobile body to make a turn (e.g. a right or left turn at an intersection) is displayed according to operation of the direction sensor 12.

Next, route guidance will be described. For route guidance to be performed, a destination needs to be set first. In the most typical setting method of destination, a map is enlarged, reduced, and scrolled via the operating unit 20, a cursor is set on a point indicating the destination, and then the point is registered as the destination. In another method, when the name (e.g., Mt. Fuji) or the type of a destination (e.g., a restaurant) is known, the destination can be set through a search by a key-word or a destination type. When the address or the phone number of a destination is known, the destination can be set by such information.

When the destination is set, the control circuit 10 finds a route from the current position to the destination that is optimal based on predetermined conditions. The conditions, which are set by the user, include various requirements such as the shortest route, the shortest time, and no toll road.

When the route is set, the control circuit 10 starts route guidance. For example, the control circuit 10 displays the route in a distinct color from the other loads, and also displays a distance to the destination from the current position and an estimated arrival time. When the mobile body comes to a position a predetermined distance from an intersection to make a turn at, the control circuit 10 outputs through a speaker 19 sound notification such as "Turn right at the intersection about 50 meters ahead" generated by the sound synthesis circuit 17.

Figure 2:
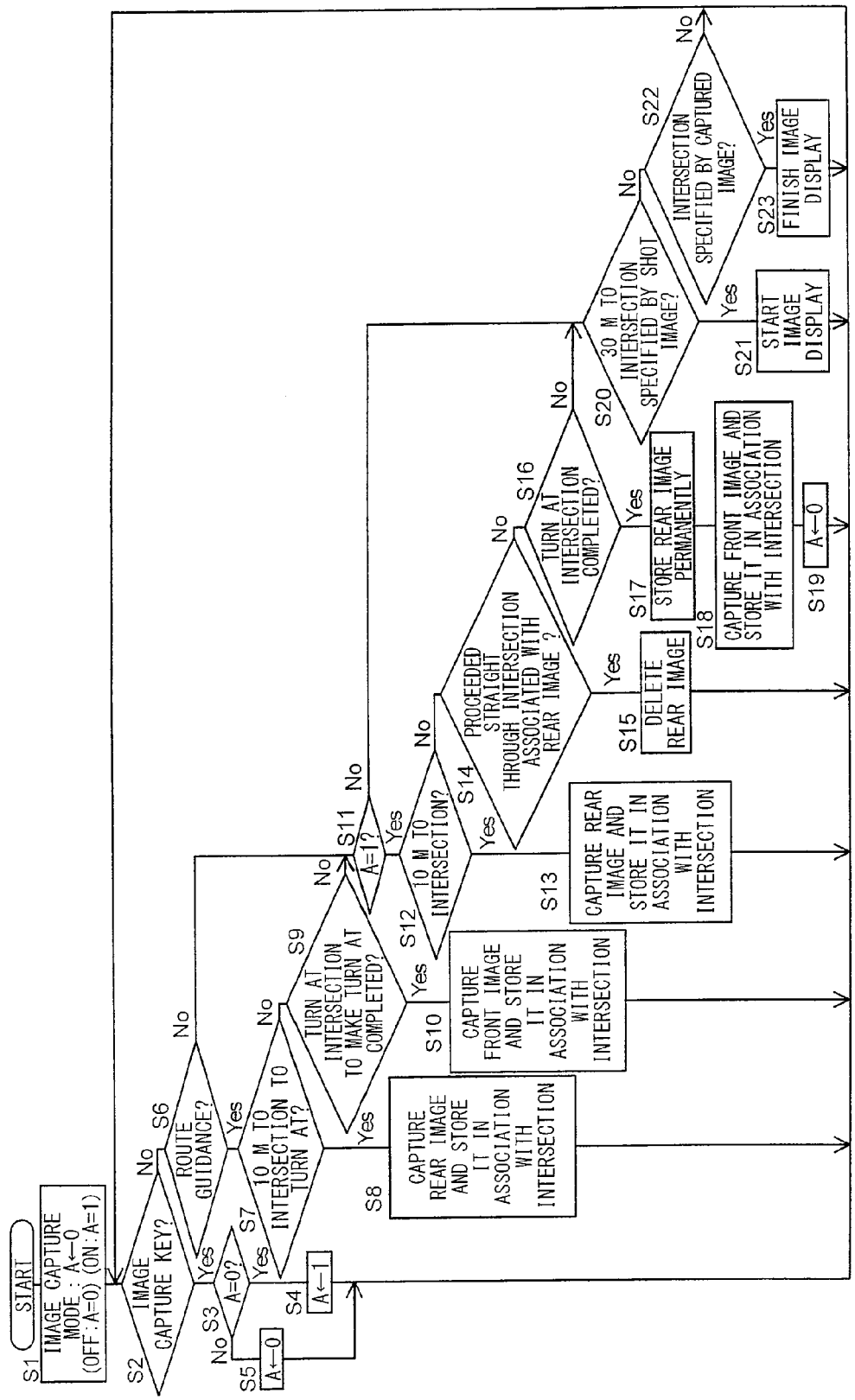
FIG. 2 is a flow chart to show operation of a control circuit of the navigation device according to Embodiment 1.

FIG. 2 is a flow chart to show image capturing and display processes performed by the control circuit 10 of Embodiment 1. The control circuit 10 stores a variable A in a register disposed inside the control circuit 10. When A is 0, the image capture mode is OFF, and when A is 1, the image capture mode is ON. The initial value of the variable A is 0 (that is, the image capture mode is OFF) (step S1). Every time the image capture key 201 is pressed down (Y in step S2), the control circuit 10 accordingly changes the value of the variable A (steps S3 to S5), and thereby turns ON/OFF the image capture mode.

While performing the route guidance (Yes in step S6), when the mobile body comes to a position that is 10 meters from the intersection to make a turn at (Yes in step S7), the control circuit 10 captures a still image (actual image) of a view behind the mobile body with the rear camera 16, and stores the resulting image in the HDD recording/playback unit 14 using an image management method that will be described later (step S8). The captured image of the view behind the mobile body is displayed when the mobile body travels in a direction opposite to the current moving direction.

In the image of the view behind the mobile body, entry and exit directions, which are directions in image display, are opposite to those when the mobile body travels in the direction opposite to the current moving direction. For example, an image of the view behind the mobile body captured in making a right turn from south to east at an intersection is the same as an image of the view ahead of the mobile body captured in making a left turn from east to south at the intersection. In storing images, since images of one same position can be obtained from images having the same intersection position information and having the same entry and exit directions, an image of old image capturing date and time is updated with an image of new image capturing date and time.

In performing route guidance (Yes in step S6), when the mobile body has finished making a turn at an intersection following the route (Yes in step S9), the control circuit 10 captures a still image of a view ahead of the mobile body with the front camera 15, and stores the captured image in association with the position information of the intersection in the HDD recording/playback unit 14 (step S10). Here, the navigation device 1 judges, from the detection result of the direction sensor 12, that the mobile body has made a turn at the intersection and has reached an image capturing point. The captured image of the view ahead of the mobile body is displayed next time the mobile body comes to the intersection. As shown in FIG. 3, in storing an image, image information of a view, the image capturing date and time, and the entry and exit directions are stored in association with the position information of the intersection.

Completion of turn is judged based on a current position obtained by the direction sensor 12 and the speed sensor 13 interpolating the current position detection by the GPS positioning unit 11, but instead, completion of turn may be judged based on a change in moving direction detected by the direction sensor 12. This makes it possible to detect a turn made at an intersection with higher accuracy than with a GPS, in which signals are received intermittently.

Also, when no route guidance is being performed (No in step S6), if the variable A is 1 (Yes in step S11), when the mobile body comes to a position that is 10 meters from a next intersection while moving (Yes in step S12), the control circuit 10 captures an image of area behind the mobile body and temporarily stores the captured image in association with position information of the intersection in the RAM 22 (step S13). And, if the mobile body does not make a turn at the intersection where image of the area behind the mobile body has been captured but goes straight through the intersection (YES in step S14), the control circuit 10 deletes the temporarily stored image of the area behind the mobile body without storing it in the HDD recording/playback unit 14 (step S15). This helps prevent unnecessary storage of records.

In step S13, when the mobile body completes a turn at the intersection where the image of the area behind the mobile body has been captured (Yes in step S16), the control circuit 10 stores the image of the scene behind the mobile body in the HDD recording/playback unit 14 by a management method that will be described later (step S17). Also, the control circuit 10 captures a still image of a view ahead of the mobile body with the front camera 15, and stores the captured image by a management method that will be described later (step S18). Then, the control circuit 10 sets the variable A back to 0 (step S19) to turn the image capture mode OFF, so as to allow the user to set anew an intersection where the user wishes to have an image captured.

The control circuit 10 continues to display image of a view stored in the HDD recording/playback unit 14 from a time when the mobile body reaches a position that is 30 meters from an intersection where the image of the view has been captured, until the mobile body reaches the intersection (steps S20 to S23).

Figure 4:
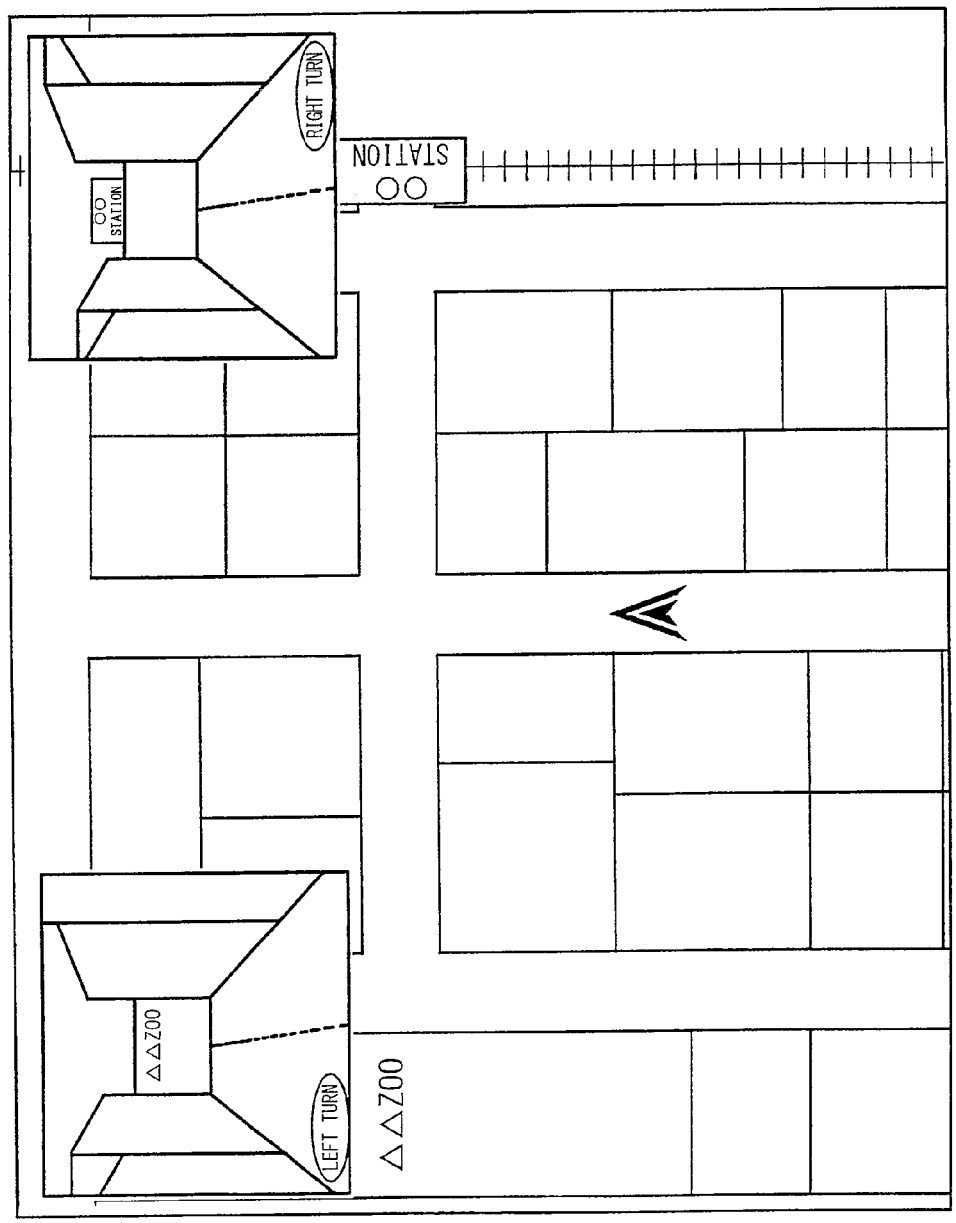
FIG. 4 is a diagram to show an example of display of a view.

FIG. 4 shows an example of how an image is displayed. When the mobile body reaches a position that is 30 meters from an intersection where an image is stored in the HDD recording/playback unit 14, the image starts to be displayed.

The image includes two images, that is, left and right images; an image for a left turn is displayed at the left top with characters "left turn" superposed thereon and an image for a right turn is displayed at the right top with characters "right turn" superposed thereon. Here, when a left image alone is displayed, it means that the user has once traveled in the left-turn direction. This operation effect can be obtained only by indicating the turning direction without displaying the characters representing right or left, that is, just by indicating the turning direction, for example, by displaying an image for a right turn on the right side and an image for a left turn on the left side. Or, right and left may be notified by way of sound.

Incidentally, even when right and left directions are not indicated at all, if the user can see, before the user makes a turn, part of the view of an area he will enter after making the turn, the user can judge in which direction the user should turn to actually see the displayed view.

Thus, according to the present invention, before a mobile body makes a turn at an intersection, an image of a view behind a mobile body is captured and stored (steps S8 and S21, steps S17 and S21), and after the mobile body makes a turn at the intersection, an image of a view ahead of the mobile body is captured and stored (steps S10 and S21, steps S18 and S21). And the stored views (captured images of views in the vicinity of the intersection) are displayed before the mobile body makes a turn at the intersection next time.

As a result, the user can see a view of an area to be entered after turning at an intersection before the user actually turns at the intersection, and thus the user can avoid making a wrong turn. Also, when the user has to wait for the traffic light to turn at the intersection, the user can see, while waiting for the traffic light to change, the display to see the view of the area to be entered after making turning at the intersection before the user actually turns at the intersection. Incidentally, in the present invention, an image generated by a third party by a DVD-RAM or the like may be used as a captured image of a view near an intersection. However, the provision of the front and rear cameras 15 and 16 allows the user of the mobile body to generate a database of views as in Embodiment 1, and this makes it possible to store views (captured images) that are more suitable for the user.

Also, according to the present invention, a view behind a mobile body is stored before the mobile body makes a turn at an intersection (steps S8 and S21, steps S17 and S21), and the stored view can be displayed as a view of an area to be entered after turning at the intersection before the mobile body actually turns at the intersection. Thus, by capturing an image of a view behind a mobile body in addition to an image of a view ahead of the mobile body, the image of the view behind the mobile body can be used on a return trip.

In capturing an image of area not ahead but behind of a mobile body, since the image capturing needs to be performed before the mobile body starts making a turn at an intersection and it is impossible to specify beforehand whether or not the mobile body is going to make a turn at the intersection, the image capturing needs to be performed with respect to every intersection. However, according to the present invention, image capturing is set to be switched between its ON/OFF modes via the image capture key 201, and the capturing of an image of area behind a mobile body is performed only in the ON mode (Yes in step S11). This allows the user to specify the intersection where an image of a view behind the mobile body should be captured, and thus unnecessary capturing can be prohibited.

In addition, according to the present invention, as shown by Yes in step S6, the above-described capturing of an image of a view behind the mobile body is performed with respect to an intersection specified in the route guidance as an intersection to turn at. This makes it possible to show the user a view of an area into which the user will enter after making a turn at an intersection as additional information in the next route guidance.

Embodiment 2

Figure 5:
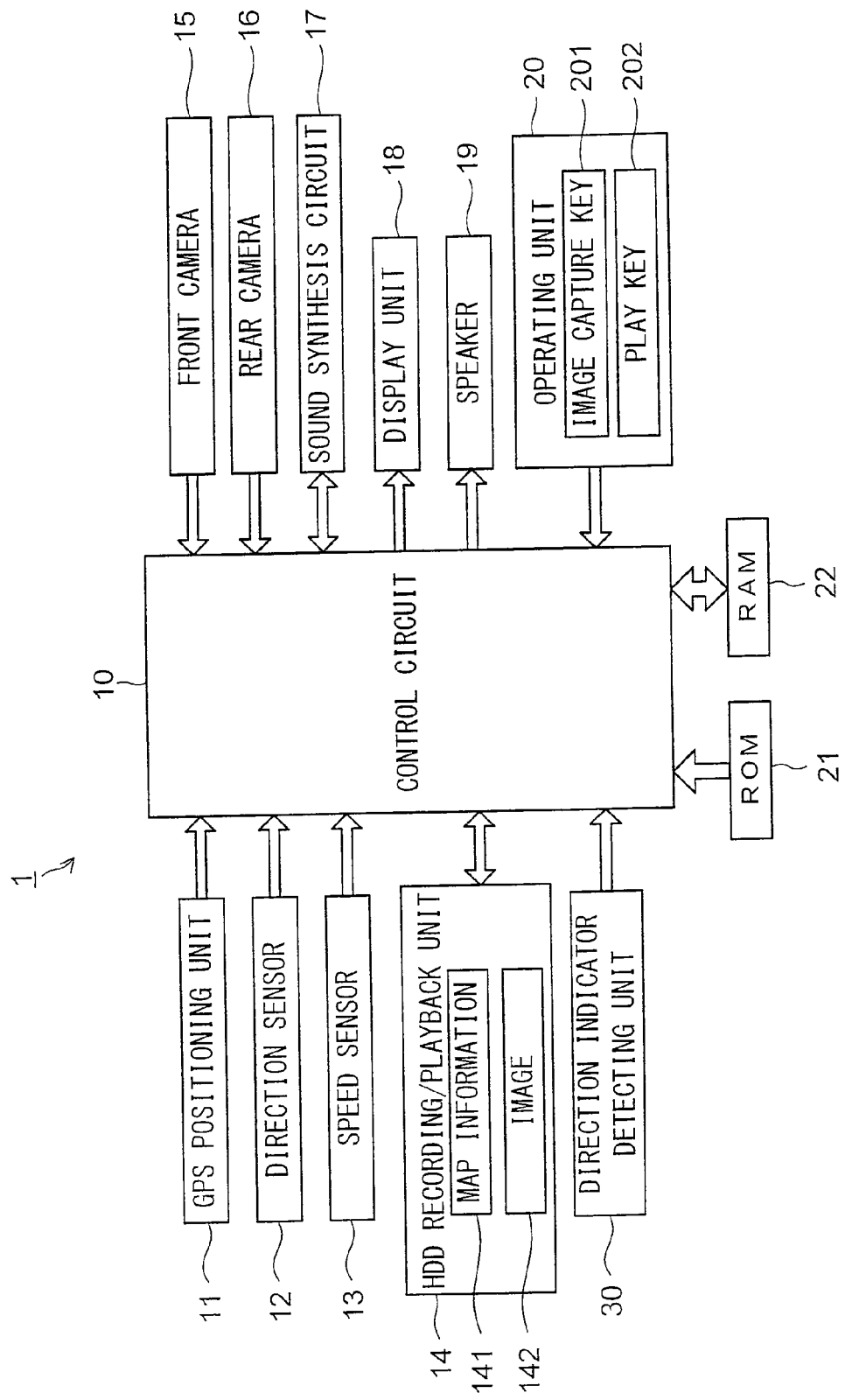
FIG. 5 is a block diagram to show a relevant part of a navigation device according to Embodiment 2 of the present invention.

FIG. 5 is a block diagram to show Embodiment 2. Components similar to those in FIG. 1 to show Embodiment 1 are identified by the same reference numbers, and descriptions thereof will be omitted. As compared with the structure of Embodiment 1 shown in FIG. 1, the structure of Embodiment 2 shown in FIG. 5 further includes a direction indicator detecting unit 30 and a play key 202 that is provided in the operated portion 20. The direction indicator detecting unit 30 detects right/left turn operation of a direction indicator and feeds its detection result to the control circuit 10. The play key 202 is a key for displaying a view of an area to be entered after making a turn at a next intersection when the user wishes.

Figure 6:
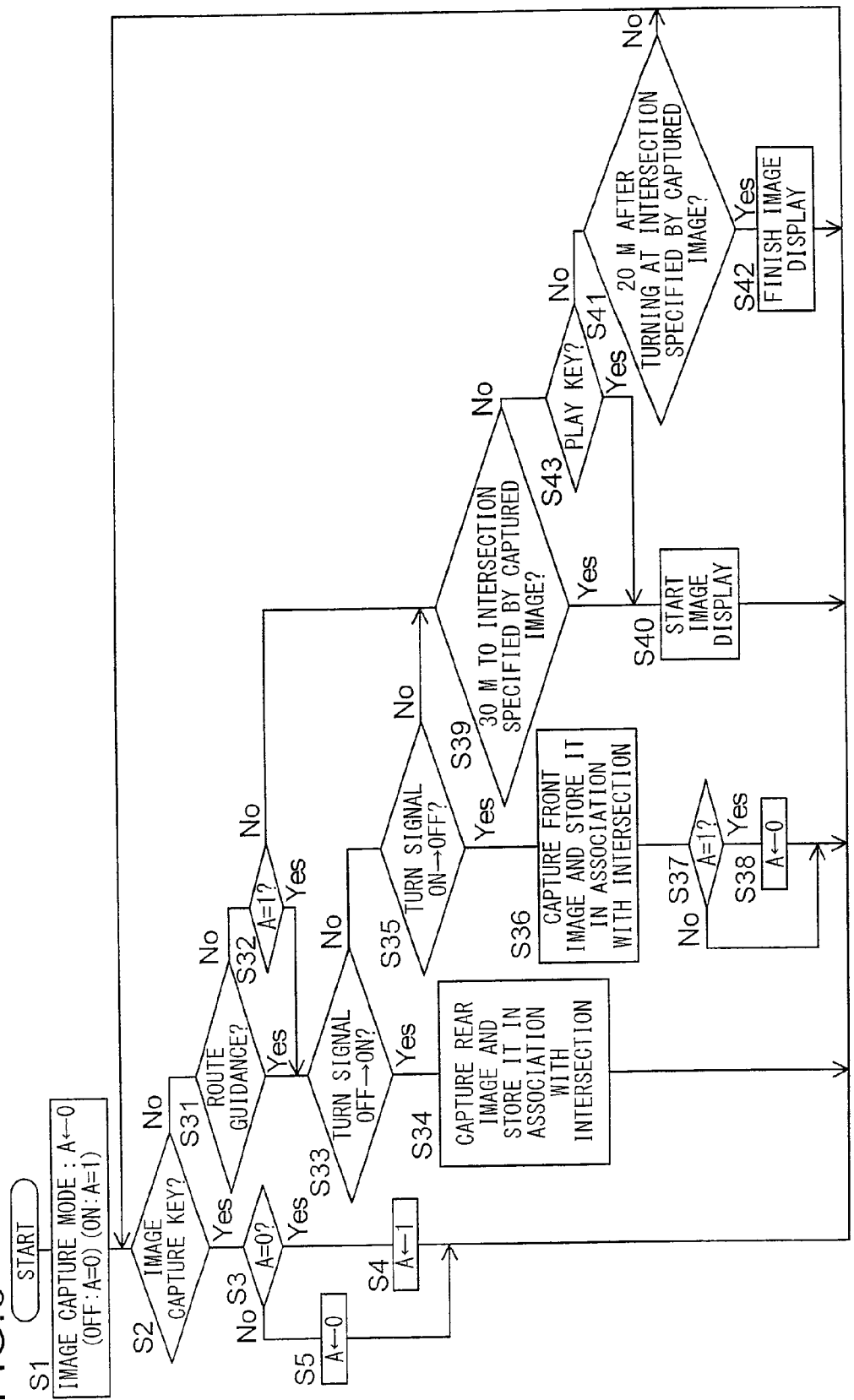
FIG. 6 is a flow chart to show operation of a control circuit of the navigation device according to Embodiment 2.

FIG. 6 is a flow chart to show image capturing/display processing performed by the control circuit 10 of Embodiment 2. The processing in steps S1 to S4 in FIG. 6 is the same as in steps S1 to S4 in FIG. 2 to show Embodiment 1, and the descriptions thereof will be omitted.

When route guidance is performed (Yes in step S31) or when the variable A is 1 (the image capture mode is ON) (Yes in step S32), if the direction indicator is turned ON from OFF (Yes in step S33), the control circuit 10 captures a still image (captured image) of a view behind the mobile body with the rear camera 16 and stores the captured image in the HDD recording/playback unit 14 by a management method that will be described later (step S34). Here, whether a turn is to be made to the right or left may also be judged according to the direction indicator, instead of according to the GPS positioning unit 11 or the direction sensor 12.

When route guidance is performed (Yes in step S31) or when the variable A is 1 (that is, the image capture mode is ON) (Yes in step S32), if the direction indicator is turned OFF from ON (Yes in step S35), the control circuit 10 captures a still image of a view ahead of the mobile body by the front camera 15 and stores the captured image in the HDD recording/playback unit 14 by a management method that will be described later (step S36). Here, whether the turn has been made to the right or left can also be judged according to the direction indicator, instead of according to the GPS positioning unit 11 or the direction sensor 12. Then, when the variable A is 1 (Yes in step S37), the variable A is set back to 0 (step S38) to turn the image capture mode OFF, so as to allow the user to set anew an intersection where the user wishes to have an image captured.

From when the mobile body reaches a position that is 30 meters from an intersection where an image of a view is stored in the HDD recording/playback unit 14 until the mobile body reaches the intersection, the control circuit 10 continues to play the image (steps S39 to S42). At this time, whether the image is related to the right turn or the left turn is also displayed. If the start key 202 is operated (Yes in step S43), the control circuit 10 starts display operation in response to the start key 202 being operated and continues the display operation until the mobile body has moved 20 meters after turning at the intersection (steps S39 to S42). At this time as well, whether the image is related to the right turn or the left turn is displayed.

As just described, according to the present invention, the direction indicator detecting unit 30 is provided to detect whether the direction indicator is ON or OFF, and timing for capturing an image of area behind the mobile body before the mobile body makes a turn at an intersection is detected based on the direction indicator detecting unit 30 (step S33).

With the navigation device of Embodiment 1, in capturing an image of a view not ahead of but behind a mobile body, since the image capturing needs to be performed before the mobile body starts making a turn and it is impossible to specify beforehand whether or not the mobile body is going to make a turn at the intersection, the capturing needs to be performed with respect to every intersection. However, with the navigation device of Embodiment 2, unnecessary image capturing can be prevented by detecting the operation of the direction indicator.

Embodiment 3

Figure 7:
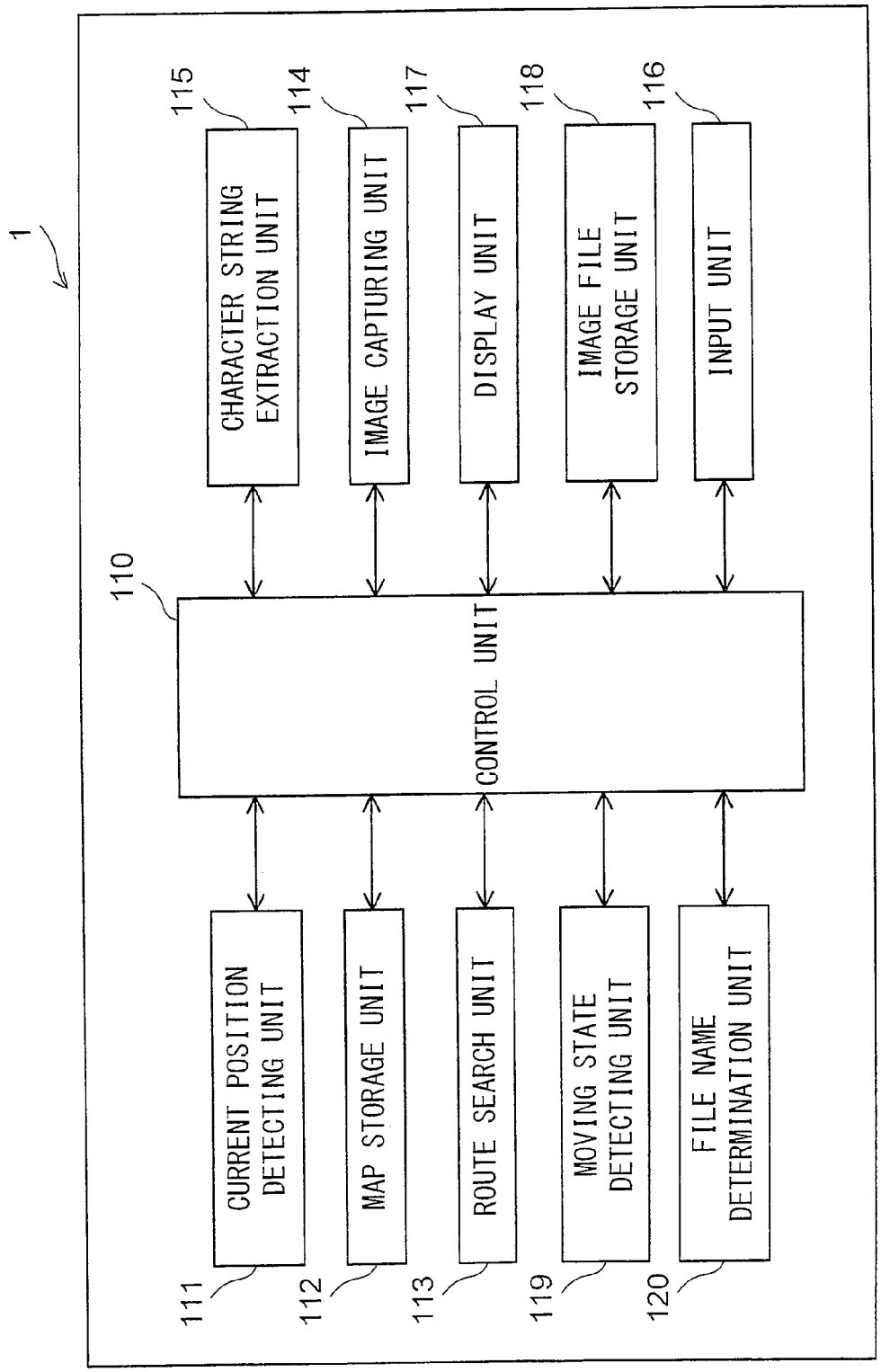
FIG. 7 is a block diagram to show a relevant part of a navigation device according to Embodiment 3 of the present invention that is for use in mobile bodies and provided with an image capturing unit.

An image data management method according to the present invention will be described below. FIG. 7 is a block diagram to show the structure of a navigation device 1 of Embodiment 3 of the present invention that is for use in a mobile body and provided with an image capturing unit. The navigation device 1 is provided with a control unit 110, a current position detecting unit 111, a map storage unit 112, a route search unit 113, an image capturing unit 114 that is composed of a CCD camera or the like, a character string extraction unit 115, an input unit 116, a display unit 117, an image file storage unit 118, a moving state detecting unit 119, and a file name determination unit 120.

The control unit 110 is composed of a processor comprising a CPU, a RAM, and a ROM, and controls operation of each unit of the navigation device 1 according to a control program stored in the ROM. The current position detecting unit 111 is composed of, for example, a GPS receiver, and receives radio waves containing time information from a plurality of GPS satellites revolving around the earth, and calculates current position information based on the received radio waves.

Furthermore, the current position detecting unit 111 may use a distance sensor and a direction sensor. In that case, the distance and direction that the mobile body has traveled are each detected, and the detected values are accumulated with respect to a standard position, and thereby the current position is calculated. This current position detection method, adopted together with GPS reception, exerts its advantage in current position detection in a tunnel where GPS radio waves cannot be received and in an area of high-rise buildings where errors are apt to happen.

The map storage unit 112 stores road data containing road node data and road link data. Here, a node is a connection point of respective roads such as an intersection and a branch point, and a link is a route between nodes. The road node data contains, for example, data of reference numerals given to road nodes, position coordinates of road nodes, a numbers of links connected to road nodes, names of intersections, and the like. The road link data contains, for example, data of reference numerals of road nodes that are a start point and an end point, respectively, of each link, road types, lengths of links (link costs), time distances, a number of lanes each link has, widths of the road, and the like. Further imparted to the road link data is data of link attributes such as a bridge, a tunnel, a crossing, and a tollgate. The road type data is information indicating whether a link is a free way or a toll way, whether a link is a national road or a prefectural road, and the like.

The map storage unit 112 further stores background data containing, for example, water system data such as data of coast lines, lakes, and river shapes, administrative border data, and facility data containing a position, a shape, and a name of a facility.

The map storage unit 112 may store, in addition to the road data and the background data, map image data stored in a vector form for the purpose of achieving easy-to-read map display. When the navigation device 1 is used, a map of a predetermined range including a current position of the navigation device 1 is extracted from the map storage unit 112, the above-mentioned road data, background data, and map image data are displayed together with the map on the display unit 117 with a current position mark that indicates the current position and an image of a guidance route superposed thereon.

When the user specifies a starting point and a destination, the route search unit 113 refers to the road data stored in the map storage unit 112, and searches for an optimal route from the starting point to the destination. This search for the optimal route is performed as follows. First, links and nodes between a road node corresponding to the current position or the starting point specified by the user and a road node corresponding to the destination specified by the user are searched for by various methods such as a Dijkstra method. Then, lengths of the links (link costs), time distances, and the like are accumulated to obtain a total link length and a total time distance. And then, a route of the shortest total link length, the shortest total time distance, or the like is selected as a guidance route, and road nodes and links along the route are provided as guidance route data.

The image capturing unit 114 is composed of a CCD camera or the like, and captures desired images such as images of nearby areas in response to an image capture button being operated. The image capture button is included in the input unit 116. The file name determination unit 120 determines a file name of data of a captured image, and the data together with the file name is stored in the image file storage unit 118. The user can retrieve a desired image file from the image file storage unit 118 to transfer the image file to a portable storage medium, which the user can later connect to a personal computer or a printing device to process or output the data.

The file name determination unit 120 determines a file name of data of an image captured by the image capturing unit 114, and the image data with the file name is stored in the image file storage unit 118. The file name determination unit 120 uses capturing date and time of an image captured by the image capturing unit 114 as a default value in determining the file name of the data of the captured image. In addition to image capturing date and time, a serial number indicating order in which the image is captured may be used in the file name. The serial number is reset at start of a new image capturing date and determined by counting one image capturing after another.

The moving state detecting unit 119 detects a moving state of the mobile body, that is, whether the mobile body is in a moving state or in a stopping state based on outputs from sensors provided in the mobile body such as an acceleration sensor, a steering angle sensor, an ignition sensor, and the like.

The character string extraction unit 115 extracts a character string from map data based on a current position detected by the current position detecting unit 111 and the map data. The character string extracted by the character string extraction unit 115 specifies the position at which the mobile body is located or an area around the position, for example, an area within 100-meter radius from the position including names of a place, a road, an intersection, a facility and the like near the current position of the mobile body.

In the navigation device 1 of the present invention, to data of an image captured by the image capturing unit 114 can be given a file name based on the capturing place of the image and the moving state of the mobile body at the time of the image capturing by the moving state of the mobile body detected by the moving state detecting unit 119 and a character string representing a name of a place, a road, or the like extracted by the character string extraction unit 115. To achieve this, when an image is captured by the image capturing unit 114, the file name determination unit 120 is fed with data of the state of the mobile body detected by the moving state detecting unit 119 and data of a character string representing a name of a place, a bridge, or the like extracted by the character string extraction unit 115.

The file name determination unit 120 determines a file name of image data in the following manner based on the state of the mobile body detected by the moving state detecting unit 119 and data of a character string representing a name of a place, a road, or the like extracted by the character string extraction unit 115, and stores the image data in the image file storage unit 118.

In determining the file name, the file name determination unit 120 selects, from predetermined character strings, according to whether the mobile body is in a moving state or in a stopping state, a character string to be interposed in the file name. For example, when the mobile body is not moving, predetermined character string such as "at" or "near" is used. The character string "at" is used when the mobile body is stopping and the character string extraction unit 115 extracts a facility name that specifies the position. The character string "near" is used when the mobile body is stopping and the character string extraction unit 115 extracts a name of a place or a facility near the position.

When the mobile body is moving, character string such as "moving along" or "moving near" is used. The character string "moving along" is used when the mobile body is moving and the character string extraction unit 115 extracts a name of a road along which the mobile body is moving, and the character string "moving near" is used when the mobile body is moving and the character string extraction unit 115 extracts a name of a place, a facility, or the like near the position.

File names of data of images captured by the image capturing unit 114 which is determined by combining a character string representing name of the capturing point of the image and a predetermined character string that is selected according to the state of the mobile body together as described above, makes it easy to later arrange a large amount of image data or to find out a desired piece of image data from a large amount of image data, with memories of a trip.

FIG. 8 is a diagram to show relation among state of the mobile body, the character string extraction result, and the predetermined character strings in file name determination. As mentioned above, the predetermined character string is selected and added to the file name as shown in FIG. 8 according to state of the mobile body, whether it is in a moving state or in a stopping state, and a character string extracted by the character string extraction unit 115 which represents name of a place, a facility, a road, or an intersection that specifies the image capturing point, or name of a place or a facility near the image capturing point. The file name determination unit 120 determines the combination of a character string and a predetermined character string as shown in FIG. 8, and gives the determined combination to the data of the captured image as its file name.

When the character string extraction unit 115 has failed to extract from the map data a character string representing a name of a place, a facility, an intersection, a road, or the like, the file name determination unit 120 adds information of the current position (latitude, longitude, and the like) to the image capturing date and time, which is a default value, and gives the result to the captured image data as its file name. Incidentally, even when the character string extraction unit 115 has succeeded in extracting a character string, the image capturing date and time, which is a default value, and the serial number of the image may be added to the file name in addition to the above-mentioned character string and the predetermined character string.

Figure 9:
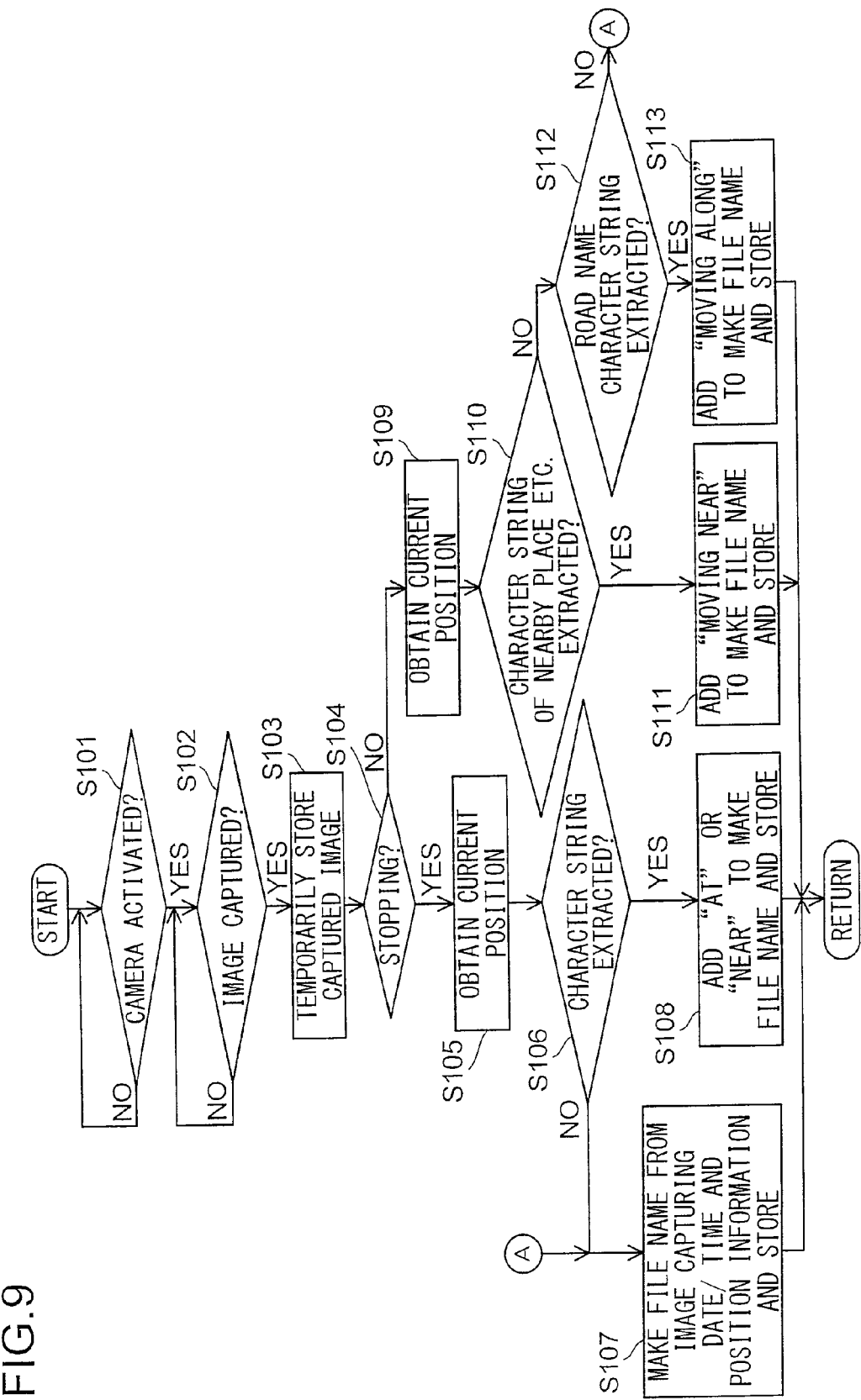
FIG. 9 is a flow chart to show a procedure of image data management performed in the navigation device according to Embodiment 3 that is for use in mobile bodies and provided with an image capturing unit.

FIG. 9 is a flow chart to show the procedure of image data management performed in the navigation device 1 according to the above-described embodiments. The control unit 110 detects activation of a camera which is the image capturing unit 114 (step S101), and in step S102, detects if image capturing has been performed by monitoring of actuation of a shutter, a flash, or the image capture button (of the input unit 116). When image capturing is detected (YES in step S102), the captured image data is stored in a temporary storage unit (not shown) such as a RAM (step S103).

Then, in step S104, it is judged, by the moving state detecting unit 119, whether the mobile body is in a moving state or in a stopping state. When the mobile body is in a stopping state, the process proceeds to step S105 in which information of a current position detected by the current position detecting unit 111 is obtained. When the mobile body is not in a stopping state, that is, the mobile body is in a moving state, the process proceeds to step S109 in which information of the current position detected by the current position detecting unit 111 is obtained.

When information of the current position is obtained in step S105, the character string extraction unit 115 refers to map data including the current position to extract a character string representing a name of a place, a facility, an intersection, a road, or the like at the current position of the mobile body, that is, at the position of the image capturing performed by the image capturing unit 114, and sends the extracted character string to the file name determination unit 120. Here, if the character string extraction unit 115 fails to extract a character string representing a name of a place, a facility, an intersection, a road, or the like at the current position of the mobile body, the character string extraction unit 115 extracts a character string representing a name of a place, a facility, an intersection, a road, or the like found in an area within a predetermined distance from the current position, and sends the extracted character string to the file name determination unit 120.

Then, in the processing performed in step S106, it is judged whether or not the character string extraction unit 115 has performed the above described extraction of the character string. When no character string is extracted, the file name determination unit 120 is informed to that effect, and then the file name determination unit 120 determines the file name of the image data temporarily stored in step S103 by, according to a default value, information of the image capturing date and time (a serial number may be added) and information of the current position, and the image data is stored in the image file storage unit 118 (step S107).

When it is judged, as a result of the judgment performed in step S106, that a character string has been extracted, the file name determination unit 120 determines the file name of the image data temporarily stored in step S103 by combining together the character string extracted by the character string extraction unit 115 and one of the predetermined character strings "at" and "near" that is selected according to the extracted character string, and the image data is stored in the image file storage unit 118 (step S108).

When a current position is obtained while the mobile body is in a moving state (step S109), the character string extraction unit 115 refers to map data including the current position to extract a character string representing a name of a road or the like that specifies the current position of the mobile body, that is, the position at which the image capturing is performed by the image capturing unit 114 (current position), and sends the extracted character string to the file name determination unit 120. In contrast, when the character string extraction unit 115 fails to extract a character string representing a name of a road, or a name of a place, a facility, an intersection, a road, or the like at the current position of the mobile body, it extracts a character string representing a name of a place, a facility, an intersection, a road, or the like in an area within a predetermined distance from the current position, and sends the extracted character string to the file name determination unit 120.

Then, in processing performed in step S110, it is judged whether or not the character string extracted by the character string extraction unit 115 represents a name of a place, a facility, or the like near the current position. When it is judged that the extracted character string represents a name of a place, a facility, or the like near the current position, the process proceeds to step S111, in which the file name determination unit 120 determines a file name of the image data by adding the predetermined character string "moving near" shown in FIG. 8 to the character string representing a name of a place or the like extracted by the character string extraction unit 115, and the image data is stored in the image file storage unit 118.

When, in the judgment processing performed in step S110, no character string representing a name of a place, a facility, or the like near the current position has been extracted, the process proceeds to step S112, in which judgment processing is performed. In the judgment processing in step S112, it is judged whether or not a character string representing a name of a road has been extracted. When a character string representing a name of a road is extracted, the process proceeds to step S113, in which the file name determination unit 120 determines a file name of the image data by adding the predetermined character string "moving along" shown in FIG. 8 to the character string representing the name of the road, and the image data is stored in the image file storage unit 118.

When, in the judgment processing performed in step S112, no character string representing a name of a road is extracted, the process proceeds to step S107, in which the file name determination unit 120 determines a file name of the image data temporarily stored in step S103 by, according to the default value, using the image capturing date and time (a serial number may be added) and information of the current position, stores the image data in the image file storage unit 118, and the process is completed.

As hitherto described in detail, with the navigation device 1 according to the embodiments of the present invention, data of an image captured by the image capturing unit 14 is stored under a file name that includes a predetermined character string selected according to the state of the mobile body and the character string that the character string extraction unit 15 has extracted from map data based on the current position. As a result, it is easy to later arrange a large amount of image data in order or find out a desired piece of image data from a large amount of image data, with memories of a trip as a guide.

According to the present invention, display of a stored view is continued until a mobile body reaches a predetermined point after it makes a turn at an intersection. This makes it possible to compare a current view with the stored view.

Furthermore, the play key 202 is provided in the present invention, and when the play key 202 is operated, a stored image of a view with respect to an intersection is displayed. This makes it possible to display, before the user actually makes a turn at an intersection, an image of a view that is to be seen after turning at the intersection, at any timing that the user desires.

Incidentally, although captured images in the above embodiments are still images, the present invention is applicable to moving images as well. In that case, in playing back an image captured as an image of area behind the mobile body, it should be played back backward.

The present invention is also applicable to mobile-phone terminals equipped with a camera and navigation which have been commercially available.

INDUSTRIAL APPLICABILITY

The present invention is applicable to camera-equipped navigation devices for use in mobile bodies, camera-provided portable navigation devices, and mobile phone terminals having navigation and camera functions.

The invention claimed is:

1. A navigation device comprising:
a first storage unit storing a map;
a display unit; and
a control unit displaying the map on the display unit, wherein
the navigation device further comprises a second storage unit storing a captured image of an area to be entered after a turn is made at an intersection, and
the control unit displays the captured image of an area to be entered after a turn is made, which is stored in the second storage unit, on the display unit before a mobile body reaches the intersection.

2. The navigation device of claim 1 further comprising a first image capturing unit capturing an image of area ahead of the mobile body in the traveling direction of the mobile body, wherein
when the mobile body has made a turn at the intersection, the control unit captures, by the first image capturing unit, an image of area ahead of the mobile body in the moving direction of the mobile body after the turn to obtain a captured image of the area, and
the control unit stores the captured image captured by the first image capturing unit in the second storage unit.

3. The navigation device of claim 2 further comprising a direction sensor detecting a moving direction of the mobile body, wherein
the control unit detects, according to detection result of the direction sensor, timing for capturing the image.

4. The navigation device of claim 2 wherein,
when the mobile body has made a turn at the intersection, the control unit stores, in the second storage unit, a direction of the turn made at the intersection in association with the captured image, and
the control unit displays, on the display unit, the direction of the turn made at the intersection together with the captured image.

5. The navigation device of claim 1 further comprising a second image capturing unit capturing an image of area behind the mobile body in the moving direction of the mobile body, wherein
the control unit captures, by the second image capturing unit, an image of area behind the mobile body in the moving direction of the mobile body before the mobile body reaches the intersection to obtain a captured image of the area, and
the control unit stores the captured image captured by the second image capturing unit in the second storage unit.

6. The navigation device of claim 5 further comprising a detecting unit detecting ON/OFF states of a direction indicator provided in the mobile body, wherein
the control unit detects, according to detection result of the detecting unit, timing for capturing the image of an area behind the mobile body in the moving direction of the mobile body before the mobile body reaches the intersection.

7. The navigation device of claim 5 wherein,
when the mobile body has not made a turn at the intersection but gone straight therethrough, the control unit deletes the captured image of the area behind the mobile body in the moving direction of the mobile body captured by the second image capturing unit and stored in the second storage unit.

8. The navigation device of claim 5 wherein the control unit switches between ON and OFF modes to activate or deactivate image capturing operation performed by the second capturing unit, and in the ON mode is captured an image of area behind the mobile body in a moving direction of the mobile body.

9. The navigation device of claim 5 wherein, when the mobile body has made a turn at the intersection, the control unit stores, in the second storage unit, in association with the captured image, a direction that is directly opposite to a moving direction in which the mobile body travels after making the turn at the intersection, and the control unit displays, on the display unit, together with the captured image, the direction that is directly opposite to the moving direction in which the mobile body travels after making the turn at the intersection.

10. The navigation device of claim 1 wherein,
when the mobile body has made a turn at the intersection, the control unit continues to play on the display unit the captured image stored in the second storage unit until the mobile body reaches a predetermined point after making the turn at the intersection.

11. The navigation device of claim 1 further comprising a play key, wherein
the control unit displays, on the display unit, the captured image stored in the second storage unit in response to the play key being operated.

12. A navigation device for a mobile body, comprising:
a current position detecting unit detecting a current position;
an image capturing unit;
an image file storage unit storing data of an image captured by the image capturing unit;
a map storage unit storing map information; and
a display unit displaying a map image, wherein
the navigation device further comprising:
a moving state detecting unit detecting whether the mobile body is in a moving state or in a stopping state;
a character string extraction unit extracting, from the map information, at least one of character strings representing a name of a place, a facility, a road, and an intersection at or near a current position; and
a file name determination unit determining a file name of data of an image captured by the image capturing unit, wherein
when the image capturing unit captures an image, a file name of data of the captured image is determined by combining a moving state detected by the moving state detecting unit, a character string extracted by the character string extraction unit, and a predetermined character string that is provided beforehand in the file name determination unit.

13. The navigation device of claim 12 wherein the predetermined character string contains either a character string indicating that the mobile body is stopping or a character string indicating that the mobile body is moving.

14. The navigation device of claim 13 wherein the predetermined character string contains a predetermined character string indicating that the character string extracted by the character string extraction unit from the map information is a character string related to a predetermined area near a current position.

15. An image management method comprising steps of:
generating a captured image of an area near a mobile body by an image capturing unit;

detecting a moving state of the mobile body whether the mobile body is in a moving state or in a stopping state;

obtaining current position information by extracting, from map information, at least one of character strings representing a name of a place, a facility, a road, and an intersection at or near the current position; and determining a name of the captured image by combining a predetermined character string that is prepared beforehand, the moving state, and the current position information.

* * * * *